United States Patent [19]

Garrett et al.

[11] Patent Number: 5,042,157
[45] Date of Patent: Aug. 27, 1991

[54] FIBER OPTIC ANGULAR ORIENTATION SENSOR DIGITAL SERIAL ENCODING

[75] Inventors: Steven L. Garrett, Pebble Beach; Michael R. Brininstool, San Diego, both of Calif.; Jeffrey T. Newmaster, Portsmouth, R.I.; Thomas Hofler, Monterey, Calif.

[73] Assignee: The United States of America as represented by the Secretary of the Navy, Washington, D.C.

[21] Appl. No.: 230,547

[22] Filed: Aug. 8, 1988

[51] Int. Cl.[5] .............................................. G09C 1/06
[52] U.S. Cl. ........................................... 33/363 K; 380/56; 250/231.13
[58] Field of Search ................. 33/363 K; 380/56, 57, 380/59; 250/231 SE, 232, 233

[56] References Cited

U.S. PATENT DOCUMENTS

| | | | |
|---|---|---|---|
| 4,078,485 | 3/1978 | Guthrie | 250/233 |
| 4,146,970 | 4/1979 | Edwards | 250/231 SE |
| 4,500,779 | 2/1985 | Killingsworth | 250/231 SE |
| 4,511,798 | 4/1985 | Killingsworth | 250/231 SE |
| 4,577,414 | 3/1986 | Migliori et al. | 33/363 K |
| 4,819,051 | 4/1989 | Jacobson | 250/231 SE |

OTHER PUBLICATIONS

Thesis: Methods of Remote Optical Angle Measurement with Compass Applications, Newmaster 9/87.
Fiber Optic Rotary Position Transducer, De Paula et al 1987.
Channel Reduction Schemes for Fiber Optic Angle Encoders, Newmaster et al. 1988.
Remote Fiber Optic Sensors for Angular Orientation, Newmaster et al. 8/87.
Applications of Time & Wavelength Division Multiplexing to Digital Optical Code Plates, Varshenya et al. 1987.

Primary Examiner—Thomas H. Tarcza
Assistant Examiner—David Cain
Attorney, Agent, or Firm—Harvey Fendelman; Thomas Glenn Keough; Michael A. Kagan

[57] ABSTRACT

A sensor provides remote angular orientation sensing. A rotational signal transmitted to a rotatable input shaft mounted in an encoder body causes the shaft to rotate. Light signals are transmitted through a digital code wheel mounted to the shaft. As the code wheel and shaft rotate, the light signals passing through the code wheel are superimposed with light pulses corresponding to incremental and directional changes of angular position of the code wheel with respect to the encoder body. The light signals are propagated through an optical fiber to a remote combination digital and analog circuit which converts them into a digital representation of the angular position of the code wheel.

16 Claims, 2 Drawing Sheets ial Serial Encoding

STATEMENT OF GOVERNMENT INTEREST

The invention described herein may be manufactured and used by or for the Government of the United States of America for governmental purposes without the payment of any royalties thereon or therefor.

RELATED APPLICATIONS

This case relates to a copending application entitled "REMOTE FIBER OPTIC ANGULAR-ORIENTATION SENSOR USING PHASE DETECTION OF TWO ORTHOGONAL OSCILLATING POLARIZATION VECTORS" by Thomas Hofler, et al., U.S. Navy Case No. 71,392, U.S. Pat. and Trademark Office Ser. No. 241,534, filed Sept. 7, 1988.

BACKGROUND OF THE INVENTION

The invention described herein is generally related to angular orientation sensors. More particularly, this invention relates to remote angular orientation sensors using digital serial encoding. Many applications require an angular orientation position sensor which can be read from a distant location. For example in many robotic systems it is necessary to monitor a tool position. With the advent of fiber optic technology, many remote angular orientation sensing applications are emerging. They include control of industrial processes and remotely piloted vehicles such as submersible marine vehicles.

Angle-sensing, and in particular remote angle sensing, traditionally has been performed primarily by electrical means. One type of sensor, a heading compass, manufactured by Digicourse of New Orleans, La., uses a remotely sensed magnetic compass with a digital code wheel and a ten bit parallel, Grey code digital mask acting as the compass card. A combination of miniature light emitting diodes (LED's) and photo detectors are used to sense the mask position and provide a bit-parallel electrical signal that can be decoded to indicate compass heading. The output of the sensor is an electrical signal that must be carried by wires. This device requires a data link composed of electrical wires that run to and from the sensor. Increasing the length of the data link in this system demands increased power consumption due to Joule heating, and requires a larger power supply.

One type of system that provides remote angle sensing but which does not require electricity at the sensor is described in Lewis, Norris, "Fiber Optic Sensors Offer Advantages For Aircraft," *Optical Engineering Reports*, June 1987. In this system, the position sensor is a reflective code wheel imprinted with a 10 channel digital mask pattern. "On" and "off" pulses corresponding to code wheel position are superimposed onto carrier light signals that pass through the code wheel to create encoded composite signals. The composite signals propagate through optical fibers to a remotely located position detecting circuit. This system requires expensive diffraction gratings and 10 channels to provide adequate resolution. Each channel requires separate hardware and results in a complex system with many components along with accompanying expense.

Still another remote angle sensing system is described in Varshneya, D., Maida, J. L. and Hakman, E. D., "Fiber Optic Rotary Position Transducer," *Fiber Optic and Laser Sensors Vs.* P. B. DePaula and E. Udd, ed. Proc. SPIE, 838 (1987). In that device, position sensing is accomplished by transmitting an optical signal via a single optical fiber to a fiber optic read head. Time division multiplexed light signals emitted from the read head interrogate a 10 channel digitally encoded reflective Grey-code encoder disc. Light signals reflect off the disc, reenter the read head, and then are propagated to an optical signal processor. Surface quality and flatness of the absorptive areas of the disc are important factors which affect signal-to-noise ratio and the threshold level of the optical signal processor. Successful operation of this device requires careful alignment of the disc surface and the fiber optic read head. Deviations from normal incidence between the path of the light signals emitted from the read head and the disc severely affect the operational characteristics of this system.

Another remote angle sensor that utilizes encoded optical signals to convey information regarding angular position has been described by Migliori, et al, in U.S. Pat. No. 4,577,414. Migliori teaches a remotely readable compass which operates by comparing the intensities of four light beams, two of which pass through a sheet polarizer. However, the Migliori device requires at least four channels to provide adequate resolution.

All of the remote angle sensing systems taught by the prior art are unduly complex and expensive because they require multiple channels to provide sufficient angular resolution. Each channel increases system complexity and requires additional components. Disadvantageously, those prior art systems which utilize reflective digital discs require critical positioning of the fiber optic read head with respect to the discs. Disc surface tolerances are also critical and increase manufacturing costs. Thus, a need exists for a simple, less expensive, and more easily manufactured remote angle sensing system.

SUMMARY OF THE INVENTION

The present invention overcomes the aforementioned limitations of remotely readable angular orientation sensors that require electricity at the sensor head, multiple data link channels, or reflective digital code wheels, and achieves a major reduction in complexity and number of components at the sensor in comparison to the prior art.

In the present invention, a laser diode emits a modulated light signal propagated through an optical link fiber to a remote encoder body where an optical directional coupler divides the light signal into two separate, equal signals. A time delay introduced into one signal with respect to the other provides two channel differentiation between signals. The signals are directed to a transparent digital code wheel imprinted with a two-channel mask pattern having alternate transparent and opaque areas. The code wheel is mounted on an input shaft which may freely rotate in the encoder body. In a second embodiment of the present invention, a magnet is mounted to the shaft so that the shaft and code wheel maintain a fixed orientation with respect to the earth's magnetic field regardless of encoder body position, allowing the invention to provide a remotely detectable compass heading.

Depending upon the angular position of the code wheel, the light signals are either encoded with "on" or "off" pulses as they are either absorbed by the opaque areas of the mask pattern or are transmitted through the code wheel. Light signals transmitted through the code wheel are reflected off of a mirror and are directed back into the respective optical fiber from which they were emitted. The signals then are recombined by an optical directional coupler to form a composite light signal.

The composite signal returns through the optical link fiber to a second optical directional coupler which directs the composite light signal to an optical receiver. The optical receiver outputs an electrical signal having a waveform corresponding to the waveform of the composite light signal. The electrical signal then is input into a lock-in amplifier which separates the electrical signal into an in-phase component signal and a quadrature component signal, each signal corresponding to a reflected light signal. The in-phase and quadrature signals are input into separate operational amplifiers which boost the signals so that they are compatable with transistor to transistor logic (TTL) devices.

The amplified in-phase and quadrature signals are output to a reset logic circuit and to an up/down counter. The up/down counter records changes in the quadrature and in-phase signals which together correspond to incremental and directional changes of angular displacement of the code wheel. The reset logic circuit detects when the digital code wheel rotates through a reference datum position. When the logic circuit detects the reference position, a reset signal is output to the up/down counter which causes it to reset to a predetermined initial value. The up/down counter produces a digital output corresponding to the angular position of the code wheel. The digital output can be input to a digital computer, a digital display, or into a digital-to-analog converter so that digital representation of angular position may be converted into human-readable form or serve as the input to another device.

OBJECTS OF THE INVENTION

An object of the present invention is to provide a remote angular sensor that does not require electricity at the sensor position.

A second object of the invention is to provide a remote angular sensor that can detect direction of angular displacement.

A third object of the invention is to provide a remote angular sensor that can detect a magnitude of angular displacement.

A fourth object of the invention is to provide a remotely readable magnetic compass wherein compass orientation information is conveyed by light beams propagated through an optical fiber.

A fifth object of the invention is to provide a remote angular sensor that can detect angular position.

Other objects, advantages and novel features of the invention will become apparent from the following detailed description of the invention when considered in conjunction with the accompanying drawings.

DESCRIPTION OF THE PREFERRED EMBODIMENT

Figure 1:
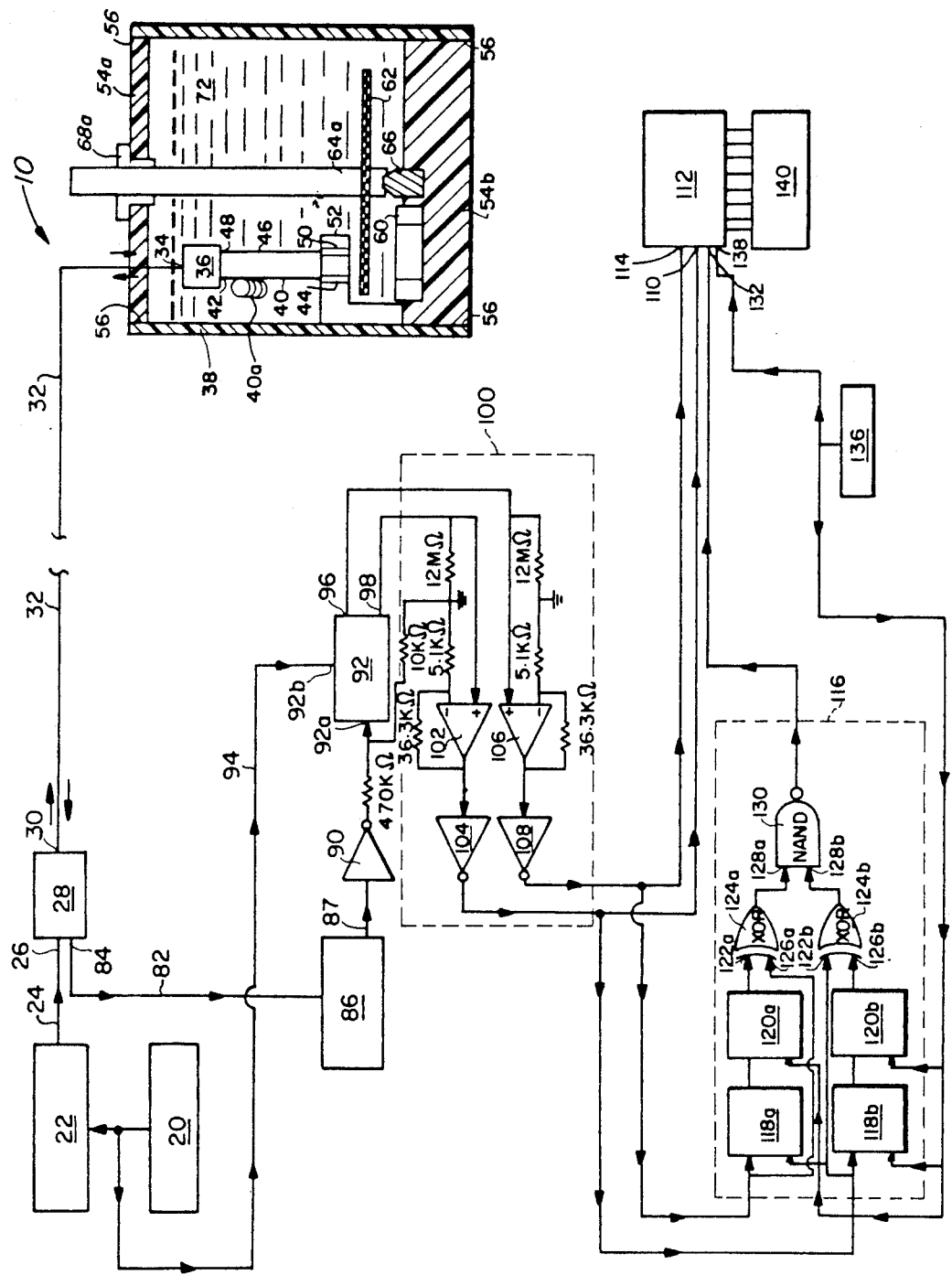
FIG. 1 is a block diagram of the optical and electrical network of the present invention and includes a sectional view of the encoder body.

Fiber optic angular orientation sensor 10 is illustrated in FIG. 1 and is described as follows: Function generator 20 drives light generator 22 with a sinusoidal signal. However, it is to be understood that the scope of the invention is not limited to sinusoidal signals, but encompasses pulsed signals as well. Light generator 22 produces an optical signal having a waveform corresponding to the output of function generator 20. Light may be generated by any suitable means, although light emitting diodes or laser diodes are the most effective means for this purpose. Light generator 22 is optically linked by optical fiber 24 to port 26 of optical directional coupler 28. Port 30 of optical directional coupler 28 is optically coupled by optical link fiber 32 to port 34 of optical directional coupler 36 mounted to encoder body 38. Optic fiber 40, optically coupled in series to fiber delay line 40a, optically links port 42 of optical direction coupler 36 to one-quarter pitch, graded refractive index rod lens 44. A suitable optical directional coupler is manufactured by ADC Telecommunications under designation number MFC-AIX-01. Optical fiber 46 is optically coupled between port 48 of optical direction coupler 36 and one-quarter pitch graded refractive index rod lens 50. Graded refractive index rod lenses 44 and 50 are mounted in fiber optic read head 52 which in turn is mounted within encoder body 38. Cap 54a and base 54b are attached to encoder body 38 by means readily understood by one skilled in this technology, as for example, by screw threads 56. Encoder body 38 may be mounted to any suitable structure, not shown, by means readily understood by one skilled in this art.

Mirror 60 is mounted to base 54 such that collimated light emitted from graded refractive index rod lenses 44 and 50 can, under specific circumstances as are discussed below, reflect off of mirror 60 with an angle of incidence of zero degrees (normal incidence) relative to the normal of the reflective surface of mirror 60. Digital code wheel 62 is fixedly mounted on rotable input shaft 64a supported by bearings 66 and 68a. Bearing 66 is mounted to base 54b. Bearing 68a is mounted to cap 54a.

Figure 2:
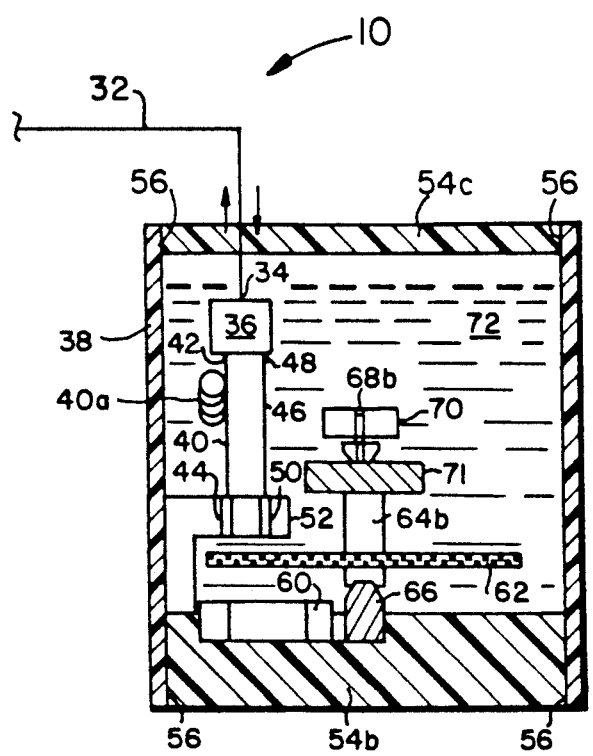
FIG. 2 is a sectional view of a second embodiment of the encoder body and its internal components modified to provide a remotely detectable compass heading sensor.

A second embodiment of the present invention provides a remotely detectable compass heading sensor. Referring to FIG. 2, optical link fiber 32 is optically coupled to optical directional coupler 36. Digital code wheel 62 is fixedly mounted on a rotatable shaft 64b supported by bearings 66 and 68b. Bearing 68b is mounted within bearing support 70 which in turn is mounted to encoder body 38. Cap 54c is mounted to encoder body 38 by means readily understood by one skilled in this art, as for example by screw threads 56. Magnet 71 is fixedly mounted to shaft 64b so that digital code wheel 62, magnet 71, and shaft 64b may freely rotate in unison with respect to encoder body 38. Torque induced by the magnetic field of the earth acting upon magnet 71 causes shaft 64b to maintain fixed alignment with respect to that magnetic field regardless of the angular orientation of encoder body 38.

Referring to FIGS. 1 and 2, fiber optic read head 52 and digital code wheel 62 may be immersed within a transparent fluid 72 contained within encoder body 38 having the same index of refraction as that of digital code wheel 62, as is well known by those skilled in this art. Fluid 72 eliminates Fresnel reflective losses and minimizes refractive dispersion of the collimated light beams attributable to vibration of digital code wheel 62 and dampens such vibrations.

Figure 3:
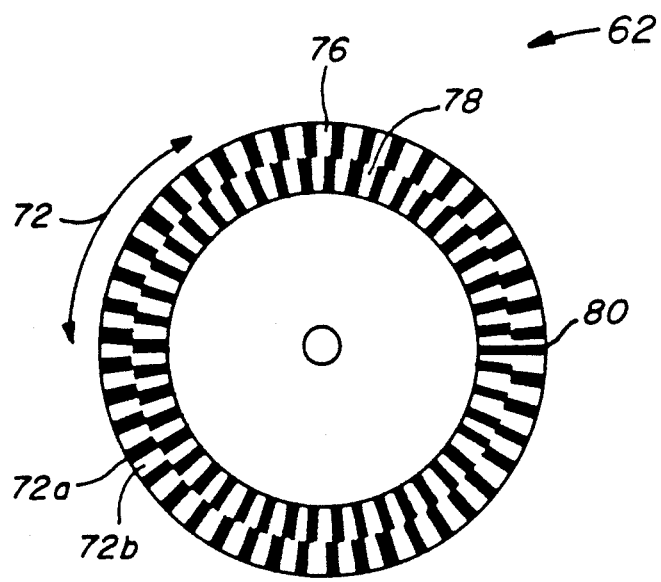
FIG. 3 is a plan view of the digital code wheel.

Referring to FIG. 3, digital code wheel 62 is constructed from a transparent polymeric material and includes two-channel encoder mask pattern 72. Mask pattern 72 consists of radially oriented alternate opaque and transparent areas, 72a and 72b, respectively, which may be imprinted on the polymeric material by means readily understood by those skilled in the art, as for example by hot stamping. Opaque and transparent areas 72a and 72b provides a total of 88 count steps for each of two concentric channels 76 and 78 resulting in 2 degrees angular resolution. Opaque reset area 80 provides digital code wheel 62 with a reference datum representing a net angular displacement of zero degrees. Reset area 80 provides approximately 4 degrees resolution. Obviously, the scope of the invention embraces two-channel mask patterns having other than 88 count steps per channel to provide resolution to suit a particular application.

Graded refractive index rod lenses 44 and 50 are positioned so that light emitted from them is directed onto channels 76 and 78, respectively, of mask pattern 72. Suitable lenses are available from NSG America, Inc. under identification number M-W1016-128-0.83.

Optical fiber 82 optically links port 84 of optical directional coupler 28 to optical receiver 86. The output of optical receiver 86 is a composite electrical signal which provides an output to inverter 90 via electrical coupler 87. The output of inverter 90 is directed to input 92a of lock-in amplifier 92. The signal provided by function generator 20 propagating via electrical coupler 94 is connected as an input to input 92b of lock-in amplifier 92. Lock-in amplifier 92 separates the inverted composite electrical signal received from inverter 90 into in-phase and quadrature signals which are then separately output from terminals 96 and 98, respectively to two-channel amplification circuit 100.

Operational amplifiers 102 and 106 of amplification circuit 100 receive the quadrature and in-phase signals, respectively, from lock-in amplifier 92. The output of operational amplifiers 102 and 106 are then provided to inverters 104 and 108, respectively.

Both the amplified and inverted quadrature and in-phase outputs of amplification circuit 100 are provided to up/down counter 112 and to logic reset circuit 116. The quadrature output of inverter 104 is connected to input channel 110 of up/down counter 112. The in-phase output of inverter 108 is directed to input channel 114 of up/down counter 112. Up/down counters are well known and commercially available, and may be for example, Hewlett-Packard Model HCTL-2000.

Logic circuit 116 includes flip-flop 118a which receives the amplified inverted in-phase output of inverter 108. The output of flip-flop 118a is provided to flip-flop 120a and then is transmitted to input 122a of exclusive-OR gate 124a. The inverted amplified in-phase output of inverter 108 also feeds directly into terminal 126a of exclusive-OR gate 124a. The output of exclusive-OR gate 124a then is input to terminal 128a of NAND gate 130. Similarly, the inverted, amplified quadrature output of inverter 104 is input into flip-flop 118b. The output of flip-flop 118b inputs into flip-flop 120b, the output of which then is transmitted to terminal 126b of exclusive-OR gate 124b. The inverted, amplified quadrature output of inverter 104 also is provided directly to terminal 122b of exclusive-OR gate 124b. The output of exclusive-OR gate 124b is provided to terminal 128b of NAND gate 130. The output of NAND gate 130 is directed to terminal 132 of up/down counter 112.

A digital clock 136 provides clock signal pulses to clock input 138 of up/down counter 112 and to reset logic circuit 116 as shown in FIG. 1. The output of up/down counter 112 feeds into receiver 140 which may be a digital-to-analog converter, a digital display or another processing device as is well understood by those skilled in this art.

DESCRIPTION OF OPERATION

Function generator 20 provides laser diode 22 with a sinusoidal signal represented as a function, F(t), where "t" represents time. The output of laser diode 22, represented by function F'(t), is a waveform signal corresponding to F(t) and is conveyed via optical fiber 24 through port 26 of optical directional coupler 28. The signal, F'(t), exits optical directional coupler 28 through port 30 and is propagated through an optical link fiber 32 to port 34 of optical directional coupler 36 located within encoder body 38. Optical directional coupler 36 divides optical signal F'(t) into two separate, equal light signals. The two equal light signals exit optical direction coupler 36 through ports 42 and 48 and separately propagate through optical fibers 40 and 46, respectively. Fibers 40 and 46 are terminated with graded refractive index rod lenses 44 and 50, respectively, which operate to collimate the light beams emitted from fibers 40.

The collimated beams emitted from lenses 44 and 50 fall incident upon digital code wheel 62 where they either pass through transparent area 72b or are absorbed by opaque areas 72a of channels 76 or 78 of mask pattern 72. As light beams emitted from lenses 44 and 50 fall incident upon and interact with code wheel 62, channels 76 and 78 alternately encode "on" and "off" pulses into the light beams whenever digital code wheel 62 rotates with respect to fiber optic read head 52, except at the reset position 80. There, channels 76 and 78 together either encode "on" or "off" pulses simultaneously. Digital code wheel 62 rotates whenever input shaft 64a receives a rotational input signal from an external rotating member, not shown, coupled thereto by means readily understood by one skilled in this art. Those beams which pass through code wheel 62 strike mirror 60 at normal incidence, reflect back through digital code wheel 62 and reenter respective lenses 44 or 50 from which they were emitted.

In the second embodiment of the present invention, depicted in FIG. 2, encoder body 38 is free to rotate about shaft 64b. As encoder body 38 rotates with respect to the earth's surface, the earth's magnetic field exerts a torque on magnet 71 causing shaft 64 to maintain its alignment with respect with the earth's magnetic field. Since digital code wheel 62 is fixedly mounted to shaft 64, graded refractive index rod lenses 44 and 50, mounted in fiber optic read head 52 of encoder body 38, rotate about "fixedly oriented" digital code wheel 62. Alternatively, digital code wheel 62 may be more conveniently described as "rotating" with respect to graded refractive index rod lenses 44 and 50 if encoder body 38 is used as a frame of reference.

Optical fiber 40 has a length greater than that of optical fiber 46 due to fiber delay line 40a so that a time delay of $\frac{1}{8}$ of pulse period F'(t) is induced into the light signal each time it propagates through optical fiber 40 relative to the light signal that propagates through optical fiber 46. Since any light signal that passes through fiber 40 must pass through that fiber twice, a $\frac{1}{4}$ period total time delay is induced into the reflected signal propagating through that fiber.

The proper light signal pulse frequency output from light generator 22 is derived from the expression:

Equation 1: $F = c/nT$

Substituting $T = 8L$ into Equation 1 yields: $F = c/8nL$, where:

T = light signal pulse period
c = speed of light (vacuum)
n = index of refraction of optical fiber (1.5)
L = length of optical fiber delay line 40a
F = light signal pulse frequency The light signal pulse frequency must be fast enough to detect rapid position changes of code wheel 62, but not so fast so as to exceed the bandwidth of lock-in amplifier 92.

In order to achieve a ¼ period total time delay, the invention was constructed such that optical fiber 40 including fiber delay line 40a had a total length of approximately 1280 meters and the light signal pulse frequency of laser diode 22 was 19.5 KHz. However, the scope of the invention includes other combinations of optical fiber lengths and light signal modulation frequencies which may be derived through equation 1 that result in a ¼ period total time delay.

Reflected light beams that return through lenses 44 or 50 propagate through corresponding optical fibers 40 or 46 enter optical directional coupler 36 where encoded information resulting from interaction between the light signals and code wheel 62 is interleaved into a composite light signal. Thus within each clock signal pulse period of clock 136, the composite light signal includes two light pulses, ¼ period out of phase with each other, each light pulse representing one channel, 76 or 78 of code wheel 62.

The composite light signal exits optical directional coupler 36 through port 34 and propagates through optical link fiber 32. This signal then enters optical directional coupler 28 through port 30, exits port 84, and propagates through optical fiber 82. Optical receiver 86 receives the composite light signal from optical fiber 82 and generates a composite electrical signal having a waveform corresponding to that of the composite light signal. The composite electrical signal is inverted by inverter 90 and then is directed to signal input 92b of lock-in amplifier 92. Reference input 92b of lock-in amplifier 92 receives reference signal F(t) produced by function generator 20 via conduit 94. Lock-in amplifier 92 separates the composite electrical signal into in-phase and quadrature signal components having waveforms which correspond to the digitally encoded light signals.

The in-phase and quadrature outputs of lock-in amplifier 92 are provided to two-channel amplification circuit 100 which separately boosts and inverts the in-phase and quadrature outputs to a level sufficient to drive transistor-to-transistor logic devices. The inverted in-phase and quadrature outputs of amplification circuit 100 are directed to up/down counter 112 through inputs 110 and 114, respectively.

The outputs of amplification circuit 100 are directed to reset logic circuit 116 as follows: The output of inverter 108 enters flip-flop 118a which stores an updated electrical signal corresponding to the present digital state of the light signal encoded by one channel, 76 or 78, of code wheel 62. The output of flip-flop 118a is then provided to flip-flop 120a. The purpose of flip-flop 120a is to store information corresponding to the digital state of a previous light signal encoded by that same channel, 76 or 78, during the previous clock pulse of clock 136. The output of flip-flop 120a then is directed to exclusive-OR gate 124a through input 122a. The output of inverter 108 also is provided directly to exclusive-OR gate 124a through input 126a. The output of inverter 104 is provided to flip-flop 118b which stores an electrical signal corresponding to the present digital state of the light signal encoded by the other channel, 76 or 78, of digital code wheel 62. The output of flip-flop 118b is provided to flip-flop 120b which stores an electrical signal corresponding to the digital state of that channel during the previous clock pulse period of clock 136. The output of flip-flop 120b is directed to exclusive-OR gate 124b through input 126b. The output of inverter 108 also is directed to exclusive-OR gate 124b through input 122b.

The outputs of exclusive-OR gates 124a and 124b are input to NAND gate 130 through inputs 128a and 128b respectively. When the position of digital code wheel 62 changes relative to graded refractive index rod lenses 44 and 50, the signals stored within each flip-flop of flip-flop pairs 118a and 120a, and 118b and 120b, will differ causing either exclusive-OR gates, 124a or 124b, to go high. When either exclusive-OR gate 124a or 124b goes high, NAND gate 130, outputs a signal which is detected by up/down counter 112. If the light signals reflecting off mirror 60 pass through reset position 80 of digital code wheel 62, both channels 76 and 78 simultaneously change identically. When this latter condition occurs, both exclusive-OR gates 124a and 124b go high, causing NAND gate 130 to go low. Up/down counter 112 then resets to a predetermined value representing a position of zero degrees.

Because channels 76 and 78 are staggered with respect to one another, the on/off information encoded by one channel will "lead" while the other "lags". Thus, depending upon the direction of relative code wheel rotation, up/down counter 112 will either "add" or "subtract" incremental counts to produce a signal corresponding to a net angular displacement of digital code wheel 62 relative to encoder body 38.

The digital output of up/down counter 112 may be transmitted to a digital-to-analog converter to convert the output to human readable form. Alternatively, the output may be used as the input to another digital device.

Obviously many modifications and variations of the present invention are possible in the light of the above teachings. It is therefore to be understood that within the scope of the appended claims the invention may be practiced otherwise than as specifically described.

What is claimed is:

1. An angular orientation sensor, comprising:
   an encoder body;
   a shaft rotatably mounted to said encoder body;
   a digital code wheel mounted to said shaft, said code wheel being transparent, said code wheel further having first and second channel mask patterns thereon, said mask patterns having alternate transparent and opaque mask areas, said first channel mask pattern being offset from said second channel mask pattern, said first and second channel mask patterns having a common reset area; and
   first means positioned in proximity to said code wheel for detecting an angular position of said code wheel with respect to said encoder body.

2. The sensor of claim 1, wherein said first means includes:
   second means positioned in proximity to said code wheel for transmitting a first light signal through said code wheel to form an encoded light signal; and
   third means positioned in proximity to said code wheel for receiving and deciphering said encoded optical signal.

3. The sensor of claim 2, wherein said second means includes:
   a function generator which produces an output having a waveform;
   a light signal generator operably coupled to receive said output of said function generator, said light signal generator producing said first light signal, said first light signal having a waveform corresponding to said waveform of said function generator; and
   a first optical fiber operably coupled to said light signal generator for propagating said first light signal from said light signal generator to said second means and for propagating said encoded optical signal.

4. The sensor of claim 3 including:
   a first optical directional coupler having first, second and third ports, said first optical fiber being optically coupled to said second port of said first optical directional coupler;
   a second optical fiber optically coupled between said light signal generator and said first port of said first optical directional coupler for propagating said first light signal from said light signal generator to said first port of said first optical directional coupler;
   a second optical directional coupler having first, second and third ports, said second optical directional coupler mounted to said encoder body, said first optical fiber optically coupled to said first port of said second optical directional coupler, said second optical directional coupler separating said first light signal into second and third light signals, said second and third light signals having second and third waveforms, respectively, being transmitted though said code wheel;
   a third optical fiber having first and second ends, said first end of said third optical fiber optically coupled to said second port of said second optical directional coupler, said second end of said third optical fiber positioned within said encoder body so as to direct said second light signal propagated through said third optical fiber incident upon said digital code wheel;
   a fourth optical fiber having first and second ends, said first end of said fourth optical fiber optically coupled to said third port of said second optical directional coupler, said second end of said fourth optical fiber positioned within said encoder body so as to direct said third light signal propagated through said fourth optical fiber incident upon said digital code wheel;
   a mirror mounted to said encoder body so that said second and third light signals transmitted though said transparent areas of said mask pattern are reflected off said mirror through said code wheel, said waveforms of said second and third light signals, respectively being superimposed with light pulses on said second and third light signals, said light pulses corresponding to a position of said code wheel, said second and third light signals being propagated through said second and third optical fibers, respectively, so that said second optical directional coupler combines said second and third optical signals into said encoded light signal having a waveform which propagates through said first port of said second optical directional coupler into said first optical fiber; and
   a fiber delay line optically coupled in series with said third optical fiber.

5. The sensor of claim 4, wherein said first means further includes:
   first and second graded refractive index rod lenses optically coupled to said second ends of said third and fourth optical fibers, respectively, to collimate said second and third light signals emitted therefrom.

6. The sensor of claim 5 in which said third means includes:
   a fifth optical fiber optically coupled to said third port of said first optical directional coupler; and
   an optical receiver connected to said fifth optical fiber to receive said encoded light signal and produce a first electrical signal having a waveform corresponding to said waveform of said encoded light signal.

7. The sensor of claim in which said third means includes:
   fourth means operably connected to said optical receiver for separating said first electrical signal into second and third electrical signals each having fourth and fifth waveforms respectively, said fourth and fifth waveforms corresponding to said superimposed second and third waveforms, respectively;
   a reset logic circuit operably connected to receive said second and third electrical signals, said reset logic circuit comparing state changes between said fourth and fifth waveforms, said reset logic circuit outputting a reset signal responsive to a time delay relationship corresponding to a reference position of said code wheel with respect to said encoder body;
   a clock operably connected to said reset logic circuit for providing a clock pulse signal to said reset logic circuit; and
   an up/down counter operably connected to said reset logic circuit, said clock, and said fourth means, said up/down counter receiving said second and third electrical signals, said reset signal, and said clock pulse signal, said up/down counter providing an output corresponding to an angular position of said encoder body with respect to said code wheel.

8. The sensor of claim 7 wherein said reset logic circuit further includes:
   a first logic circuit operably connected to receive said second electrical signal and said clock pulse signal;
   a second logic circuit operably connected to receive said third electrical signal and said clock pulse signal; and
   a NAND gate having first and second inputs, said NAND gate operably connected to receive the outputs of said first and second logic circuits in said first and second inputs respectively, the output of said NAND gate being said reset signal.

9. The sensor of claim 8 wherein:
   said first logic circuit, includes:

a first flip-flop having first and second inputs and an output, said first input operably connected to receive said second electrical signal, said second input operably connected to receive said clock pulse signal, said first flip-flop storing a signal corresponding to a present position of said encoder body with respect to said code wheel;

a second flip-flop having first and second inputs and an output, said first input operably connected to receive said output of said first flip-flop, said second input operably connected to receive said clock pulse signal, said output of said first flip-flop corresponding to a position preceding said present position of said code wheel with respect to said encoder body; and an exclusive-OR gate having first and second inputs and an output, said first input operably connected to receive said output of said second flip-flop, said second input operably connected to receive said second electrical signal, said output being provided to said first input of said NAND gate;

said second logic circuit includes:

a first flip-flop having first and second inputs and an output, said first input operably connected to receive said third electrical signal, said second input operably connected to receive said clock pulse signal, said first flip-flop storing a signal corresponding to a present position of said encoder body with respect to said code wheel;

a second flip-flop having first and second inputs and an output, said first input operably connected to receive said output of said first flip-flop, said second input operably connected to receive said clock pulse signal, said output of said first flip-flop corresponding to a position preceding said present position of said encoder body with respect to said code wheel; and an exclusive-OR gate having first and second inputs and an output, said first input operably connected to receive said output of said second flip-flop, said second input operably connected to receive said third electrical signal, said output being provided to said first input of said NAND gate.

10. The sensor of claim 9 wherein:

said fifth means is a lock-in amplifier having first and second inputs and first and second outputs, said first input operably connected to receive said function generator output, said second input operably connected to receive said first electrical signal, said first and second outputs providing said second and third electrical signals both to said reset logic circuit and to said up/down counter.

11. The sensor of claim 10 wherein:

said third means includes:

a two-channel amplifier having first and second inputs, and first and second outputs, said first and second inputs operably connected to receive said second and third electrical signals, respectively from said lock-in amplifier, said first and second outputs being provided both to said reset logic circuit and to said up/down counter.

12. The sensor of claim 11 further including:

a magnet fixedly mounted to said shaft to maintain constant alignment of said shaft with respect to the earth's magnetic field.

13. A method for remotely detecting the angular position of a transparent code wheel having a two-channel mask pattern with respect to a body, comprising the steps of:

generating a first modulated light beam;

generating a second modulated light beam having a phase lag with respect to said first light beam;

directing said first and second light beams incident upon said mask pattern to encode said first and second light beams with information corresponding to a position of said code wheel with respect to said body;

processing said first and second light beams to calculate said position of said code wheel with respect to said body; and displaying said position of said code wheel.

14. The process of claim 13 further comprising the step of:

sinusoidally modulating said first and second light beams.

15. The process of claim 14 wherein the step of directing further includes:

directing said first and second light beams incident upon first and second channel mask patterns, respectively, said mask patterns having alternate opaque and transparent areas, said first channel mask pattern being offset from said second channel mask pattern, said first and second channel mask patterns having a common reset area.

16. The process of claim 15 wherein the step of generating said second light beam includes:

generating said second light beam with a ninety degree phase lag with respect to said first light beam.

* * * * *

UNITED STATES PATENT AND TRADEMARK OFFICE
CERTIFICATE OF CORRECTION

PATENT NO.   : 5,042,157
DATED        : August 27, 1991
INVENTOR(S)  : Steven L. Garrett et al It is certified that error appears in the above-identified patent and that said Letters Patent is hereby corrected as shown below:

1. Column 1: line 3:
   Insert --USING-- immediately before "DIGITAL".

2. Claim 7: Column 10: line 28:
   Insert --6-- between "claim" and "in".

3. Page 1: Change the title of the patent by inserting --USING-- between "SENSOR" and "DIGITAL".

Signed and Sealed this

Twelfth Day of January, 1993

Attest:

DOUGLAS B. COMER

Attesting Officer

Acting Commissioner of Patents and Trademarks